UNITED STATES PATENT OFFICE.

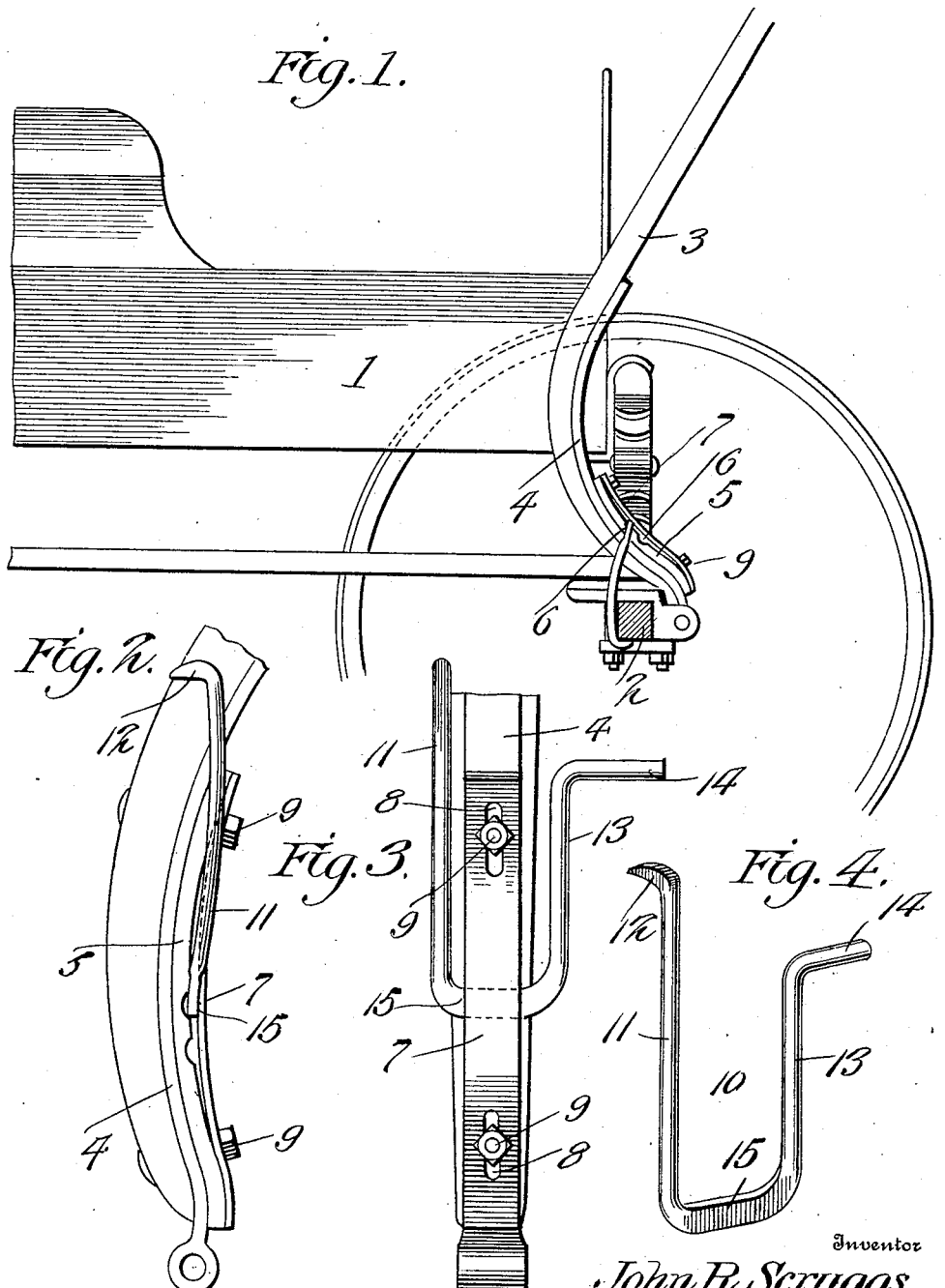

JOHN R. SCRUGGS, OF HOLLADAY, TENNESSEE.

VEHICLE-SHAFT SUPPORT.

No. 909,693.     Specification of Letters Patent.     Patented Jan. 12, 1909.

Application filed June 3, 1908. Serial No. 436,454.

*To all whom it may concern:*

Be it known that I, JOHN R. SCRUGGS, a citizen of the United States, residing at Holladay, in the county of Benton and State of Tennessee, have invented new and useful Improvements in Vehicle-Shaft Supports, of which the following is a specification.

This invention relates to thill or shaft supports for vehicles, its object being to provide a simple and effective device permanently mounted upon the shafts and adapted to be engaged with the front axle to support the shafts in an elevated position while the draft animal is being led into position for harnessing to the vehicle, and also while the vehicle is stored within a stable or barn to save storage space.

The invention consists of the features of construction, combination and arrangement of parts hereinafter fully described and claimed, reference being had to the accompanying drawings, in which:—

Figure 1 is a fragmentary side elevation of a buggy equipped with my invention, the front axle being shown in cross-section. Figs. 2 and 3 are, respectively, side and bottom plan views of the pivoted end of one of the thill or shaft sections with the improved support applied thereto. Fig. 4 is a perspective view of the holding device or latch.

Referring to the drawing, 1 indicates the vehicle body or bed, 2 the front axle thereof, 3 one of the thills or sections of the shafts, and 4 the usual shaft iron applied thereto and pivotally connecting the same with the front axle.

Upon the underside of the thill iron 4 is arranged a bearing plate 5 provided in its outer or underside with a plurality of bearing seats or recesses 6, and longitudinally disposed upon the outer or underside of this bearing plate is a plate spring 7 having longitudinal end slots 8 for the passage of securing bolts 9 which secure both the spring and bearing plate to the thill.

The holding device comprises a U-shaped latch 10 having a long arm 11 longitudinally curved and provided at its free end with an engaging hook 12, and a short arm 13 provided at its free end with a laterally or right angularly bent crank or handle 14. The cross-bar or return portion 15 of the latch which connects the opposite ends of the arms is flattened to seat within one or the other of the recesses 6 and to engage the spring plate 7, and, as shown, said cross-bar extends, transversely between the bearing plate and spring to dispose the arms 11 and 13 on opposite sides of the thill or shaft section. The latch is thus pivotally mounted so that when the shafts are swung up said latch may be manually swung forwardly or rearwardly by the crank handle 14 to throw the hook 12 into and out of engagement with the axle 2.

It will be understood that the latch when out of use may be disposed parallel with the bearing plate and held in a non-interfering position, as shown in Figs. 2 and 3, between the plate and spring by the pressure of the latter. When the shafts are swung up the latch may be operated by the crank handle to swing the hooked arm forwardly and downwardly to bear against the rear side of and engage under the axle, thus holding the shaft in an elevated position. In this operation the cross bar 15 seats and is held within one of the recesses 6, thus preventing the latch from shifting, and by engaging said cross bar with one or the other of said recesses the latch may be adjusted to hold the shafts at a higher or lower elevation or to provide for variations in the distance between the shafts and axle in different vehicles. Upon moving the crank handle rearwardly the latch may be swung out of engagement with the axle, leaving the shafts free to be lowered.

The device is simple in construction, may be produced at a comparatively low cost, and may be readily applied to existing vehicles.

Having thus fully described the invention, what is claimed as new is:—

1. In a vehicle shaft support, the combination with the front axle and shafts, of a bearing plate mounted upon the shafts, a pressure spring arranged for coöperation with said plate to form an intervening guideway, and a U-shaped latch pivotally and slidably mounted in said guideway and provided with a hooked arm to engage the axle and with an operating arm having an actuating handle.

2. In a vehicle shaft support, the combination with the front axle and shafts, of a U-shaped latch pivotally mounted upon the shafts and provided with a hooked arm to engage the axle and an operating arm formed with a laterally bent crank, and a pressure spring for holding said latch in adjusted position.

3. In a vehicle shaft support, the combination with the front axle and shafts, of a bearing plate mounted upon the shafts and provided with seat recesses, a pressure spring coöperating with said plate, and a U-shaped latch having its cross-bar pivotally mounted between the plate and spring and adapted to be engaged with said seat recesses, one of the arms of said latch being hooked to engage the axle and the other having an operating crank.

4. In a vehicle shaft support, the combination of the front axle and shafts, a bearing plate mounted upon the shafts, a pressure spring arranged for coöperation with said plate to form an intervening guide-way, and a U-shaped latch pivotally and slidably mounted in said guide-way for adjustment to different operative positions, and provided with a hooked arm to engage the axle and an operating arm, the latter having an actuating handle.

In testimony whereof I affix my signature in presence of two witnesses.

JOHN R. SCRUGGS.

Witnesses:
W. G. McIllwain,
S. S. W. Holladay.